April 24, 1928.

C. MACMILLAN

POWER SYSTEM

Filed July 26, 1923.

1,667,633

Inventor:
Campbell Macmillan;
by
His Attorney.

Patented Apr. 24, 1928.

1,667,633

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER SYSTEM.

Application filed July 26, 1923. Serial No. 654,008.

My invention relates to power systems wherein an electric motor having a rotor member provided with a plurality of windings is utilized to drive a load device, and has for its object the provision of means whereby the connection of a rotor winding may be controlled in a simple, reliable and efficient manner.

Under various conditions of operation the alternating current motor is required more or less frequently to reverse its direction of rotation and in certain cases this reversal must be accomplished with an opposing torque of considerable value exerted on the motor shaft. Thus in a ship propulsion system, for example, when it is desired to reverse the direction of the ship's movement from full speed ahead, it is necessary both to counteract the rotational inertia of the motor rotor member and to bring the propeller to rest against the torque exerted upon it as it is dragged through the water by the momentum of the ship.

An induction motor with a double rotor winding is peculiarly adapted to reverse the direction in which a load device is driven, and as commonly constructed comprises a high resistance squirrel cage winding and a definite winding of low resistance arranged to be open-circuited during acceleration of the motor and to be connected as a low resistance squirrel cage winding when normal operating conditions have been attained. This arrangement therefore involves the necessity of providing switches for controlling the connection of the low resistance rotor circuit and, since the currents interrupted may amount to hundreds and even thousands of amperes, these switches must have the capacity to transmit and interrupt fairly high currents. In the past it has been considered necessary to mount these rotor switches or contacts external to the rotor structure and to make the necessary connections between them and the low resistance winding through slip rings and brushes which involves the objectionable use of sliding contact. In accordance with my invention the contactors are placed within the rotor structure and the necessity of conducting large currents through the slip rings and brushes is avoided. This arrangement is of special advantage in that it permits the use of larger rotor currents and allows the motor to be designed for a lower maximum voltage.

My invention will be better understood on reference to the following description taken in connection with the accompanying drawing and its scope will be pointed out in the appended claims.

Figure 1:
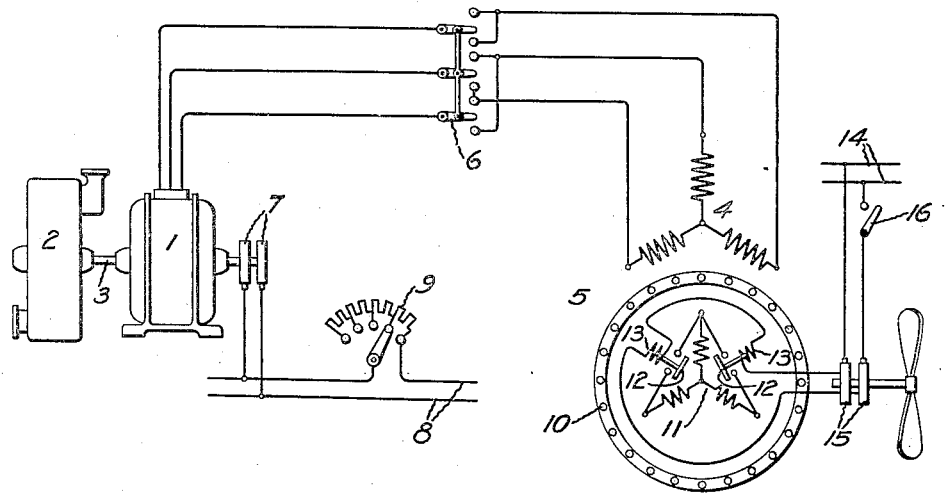
Figure 2:
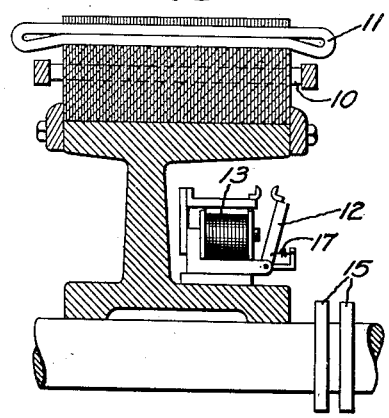
Figure 3:
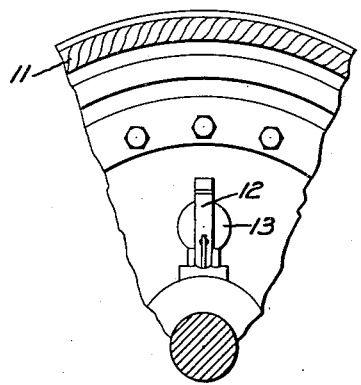

Referring now to the drawing, Fig. 1 shows a system of ship propulsion in which my invention has been embodied; Fig. 2 shows a fragmentary sectional view of a motor rotor member constructed in accordance with my invention; and Fig. 3 is a fragmentary end view of the rotor member shown in Fig. 2.

Fig. 1 shows an alternating current generator 1 coupled to a steam turbine 2 through a shaft 3 and arranged to supply current to the stator winding 4 of a propeller motor 5 through reversing and disconnecting switch 6, the generator 1 being provided with slip rings 7 for conducting exciting current to its field coils from a suitable source of current 8 through a regulating rheostat 9. The rotor of the motor 5 is provided with a high resistance squirrel cage winding 10 and a low resistance definite or phase wound winding 11 adapted to have its terminals short-circuited by electroresponsive means shown as switches 12 provided with operating coils 13 arranged to be connected to a source of current 14 through slip rings 15 and switch 16. As indicated by Figs. 2 and 3, the switches 12 are arranged so that they will be unaffected either by sudden acceleration or deceleration of the rotor member or by centrifugal force. When this arrangement necessitates an inconvenient location of the contactors their movable parts may be counterbalanced so as to cancel such inertia effects. As indicated in Fig. 2 springs 17 are provided for biasing the switches 12 to open position against centrifugal forces. The opening and closing of the switches is unaffected by sudden acceleration or deceleration by reason of the fact that they are pivoted for movement in a plane including the shaft of the motor.

Assuming the various switches to be in the positions indicated in Fig. 1, the ship may be brought up to full speed in the ahead direction by closing the switch 6 in a direction to give the proper phase rotation at the terminals of the motor 5. Under these conditions the motor is brought up to speed with the high resistance squirrel cage winding 10 effective to produce high starting torque. When a suitable speed has been reached the switch 16 may be closed thereby connecting the definite winding 11 as low resistance secondary for normal operation of the motor.

When it is desired to reverse the direction of rotation, the field excitation of the generator 1 is reduced, the definite winding 11 is opened by operation of the switch 16, and the switch 6 is closed in the proper direction. Under these conditions the motor operates with a high resistance speed torque characteristic. When the motor has been reversed the definite winding may be short-circuited by closure of the switch 16, the generator speed having been previously reduced to a point at which the torque of the motor operating on its low resistance characteristic is in excess of the torque exerted on the propeller as it is dragged through the water. The motor will then operate with a low resistance speed-torque characteristic and may be brought up to full speed by increasing the speed of the generator.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is,—

1. The combination of an induction motor comprising a rotor member having a high resistance winding and a low resistance winding arranged to have its terminals interconnected during normal operation, a plurality of contactors mounted within the rotor structure of said motor and arranged so that they will be unaffected by sudden acceleration or deceleration of the rotor structure and by centrifugal forces for interconnecting said terminals, and means external to said motor for controlling the energization of said contactors.

2. The combination of an induction motor comprising a rotor member having a high resistance winding and a low resistance winding arranged to have its terminals interconnected during normal operation, a plurality of magnetically operating switches for interconnecting said terminals pivoted for movement in planes including the shaft of said motor and biased to open positions against centrifugal forces located within said rotor member, and means external to said motor for controlling the operation of said magnetically operated switches.

In witness whereof, I have hereunto set my hand this 25th day of July, 1923.

CAMPBELL MACMILLAN.